United States Patent [19]
Dietrick

[11] Patent Number: 5,176,837
[45] Date of Patent: Jan. 5, 1993

[54] WATER PURIFICATION SYSTEM AND DRUM BAGGER

[75] Inventor: Gerald P. Dietrick, Florence, Ky.

[73] Assignee: Venture Production Company, Walton, Ky.

[21] Appl. No.: 695,976

[22] Filed: May 6, 1991

[51] Int. Cl.⁵ .................. B01D 29/11; B01D 29/27
[52] U.S. Cl. ..................... 210/767; 210/196; 210/258; 210/416.1
[58] Field of Search ............ 210/169, 416.2, 808, 210/767, 194, 195.1, 197, 195.3, 258, 416.1-416.5

[56] References Cited

U.S. PATENT DOCUMENTS

| | | |
|---|---|---|
| 2,533,395 | 12/1950 | Paine. |
| 2,714,349 | 8/1955 | Johnston. |
| 2,913,120 | 11/1959 | Glasby, Jr. et al. |
| 3,504,798 | 4/1970 | Anetsberger. |
| 3,943,580 | 3/1976 | Carter .................. 210/169 |
| 4,397,745 | 8/1983 | Troller. |
| 4,501,659 | 9/1986 | Henk .................. 210/169 |
| 4,826,591 | 5/1989 | Macia .................. 210/416.2 |
| 4,871,454 | 10/1989 | Lott. |
| 5,000,846 | 3/1991 | Dietrick et al. |

*Primary Examiner*—Frank Sever
*Attorney, Agent, or Firm*—Wood, Herron & Evans

[57] ABSTRACT

A water purification system includes a settling tank to allow small particulate material to settle on the bottom of a conical section. The liquid from the bottom of the tank is pulled to the top of a drum bagger which is a depressurized filtration apparatus. The drum bagger includes a filter bag separated from the outer walls of a drum and a vacuum source at the bottom of the drum adapted to suck liquid from the bottom of the drum. The vacuum source is an eductor which creates a vacuum by pumping liquid through the eductor either to a holding tank or back to the settling tank. This drum bagger separates the liquid from solid material and can even dry the solid material reducing disposal costs.

11 Claims, 3 Drawing Sheets

WATER PURIFICATION SYSTEM AND DRUM BAGGER

BACKGROUND OF THE INVENTION

There are a myriad of different water purification systems currently available and in use. Depending on the particular material being treated, certain technologies become advantageous.

In filtration, liquid passes through a filtration medium. This can be accomplished through a number of ways such as the use of pressure to force the liquid through the filtration medium, the use of a vacuum to suck the material through a filtration medium or means such as capillary action. Settling tanks are also used as a source of water purification allowing suspended particulate matter to fall to the bottom allowing the cleaner water to remain towards the top.

One type of settling tank and filtration system which uses a vacuum to remove liquid and separate it from associated particulate matter is discussed in U.S. Pat. No. 5,000,846, the disclosure of which is incorporated herein by reference. This discloses a system to remove relatively purified liquid from a settling tank and to allow particulate matter to settle to the bottom of the tank. The settled particulate matter as indicated must still be removed.

This could be simply pumped down the drain. But this is often inappropriate due to environmental regulations. To separate the liquid from this particulate matter, a separate filtration system is needed.

There are many known separation systems. For example Traller U.S. Pat. No. 4,397,745 discloses a pressurized system, Glasby U.S. Pat. No. 2,913,120 discloses a vacuum delivery with gravity filtration and Paine U.S. Pat. No. 2,533,395 discloses a pressurized system. Anctsberger U.S. Pat. No. 3,504,798 and Lott U.S. Pat. No. 4,871,454 both disclose vacuum systems and Johnston U.S Pat. No. 2,714,349 discloses a combination of these.

The pressurized systems are particularly troublesome. The increased pressure requires filtration vessels which are stronger and therefore more expensive. Gravity filtration systems are less efficient. Vacuum systems are more preferred, but suffer from the disadvantage that they require a separate vacuum pump to operate.

SUMMARY OF THE INVENTION

It is therefore an object of the present invention to provide a filtration system which accepts a water slurry via vacuum feed from a settling tank but does not require a separate vacuum pump to operate.

It is further an object of the present invention to provide a filtration apparatus which separates a liquid filtrate from a solid filtrate and dries the filtrate. This leaves behind a dry mass which is easier to dispose.

Further, it is an object of the present invention to provide a filtration system which incorporates a vacuum created by a liquid eductor.

More particularly, such an eductor would use a pump which was already required for removing clean liquid from a settling tank, to operate the eductor, or alternately employ a pump used to feed unpurified liquid to the settling tank to operate the eductor.

In accordance with these objects, the present invention comprises a drum bagger which includes a filtration medium, preferably a cylindrical basket separated from the side walls of the drum bagger and a vacuum eductor at the bottom of the drum bagger. A pump which is used to remove purified liquid from a settling tank is also used to direct purified liquid through the eductor to create a vacuum thereby sucking unpurified liquid from the drum bagger. The liquid coming from the eductor is directed back to the settling tank for further purification.

Further, the present invention includes a water purification system which incorporates a drum bagger which sucks liquid from the bottom of the settling tank to the top of the drum bagger, a liquid eductor at the bottom of the drum draws liquid from the drum bagger. Such a system would incorporate one pump to both draw liquid from the settling tank and at the same time power the eductor.

This system is both efficient and reduces cost. Since pressurization is limited to atmospheric (15 psi), the drum bagger can be made from relatively thin metal. Since only one pump is required to both draw from the settling tank and power the eductor, costs are reduced. Using an efficient timing system, this pump can be operated continuously to effectively run the water purification system.

Further, the decreased pressure within the drum bagger facilitates drying the filturate. A drum heater can be employed to further assist this.

The objects and advantages of the present invention will be further appreciated in light of the following detailed description and drawings in which:

DETAILED DESCRIPTION

Figure 1:
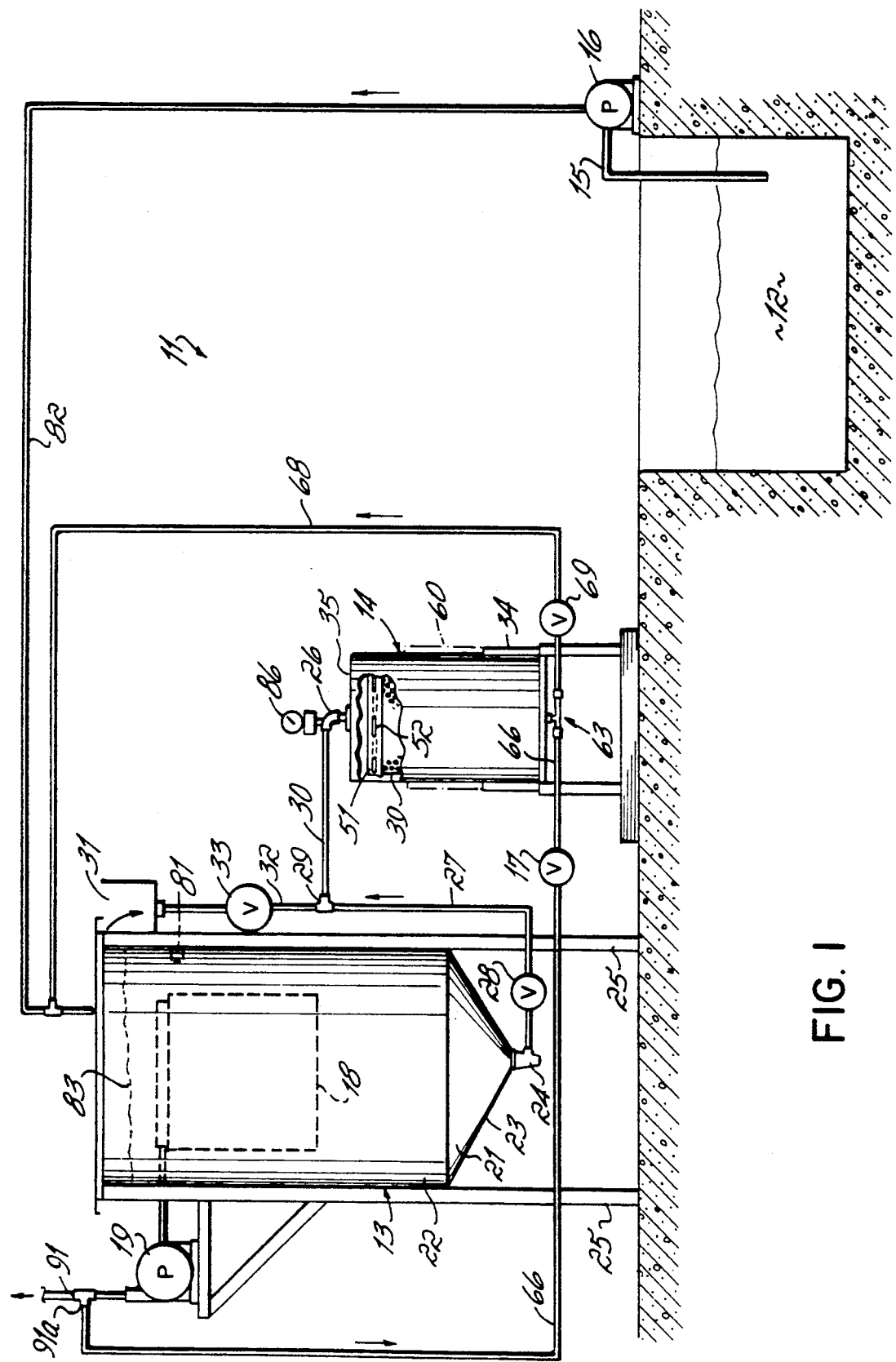
FIG. 1 is a diagrammatic view of the present invention.

As shown in FIG. 1, a water purification system 11 includes a source of unpurified liquid or an unpurified liquid containment area 12 in combination with a settling tank 13 and a drum bagger 14. The liquid containment area 12 as shown is an underground holding facility. This can also be a tank or other suitable liquid containment source.

A pipe 15 is directed from the liquid containment area 12 to a first pump 16 which directs fluid to the top 83 of the settling tank 13 via pipe 82.

Settling tank 13 incorporates a plurality of filters 18 which communicate with a second pump 19 which sucks liquid through the filters 18 removing filtered liquid from the settling tank 13.

The particular filter medium is disclosed in Dietrick et al U.S. Pat. No. 5,000,846.

Other filtration apparatus could be used or if desired liquid could simply be allowed to run off allowing particulate matter to settle to the bottom 21 of the settling tank 13. The settling tank 13 itself includes a cylindrical side wall 22 and a conical bottom wall 23 leading to an outlet 24.

The tank 13 is supported by legs 25. The outlet 24 is connected to an inlet 26 of drum bagger 14 via pipe 27 through T-fitting 29 and pipe 30. Between the outlet 24 and pipe 27 is a valve 28.

The settling tank 13 also includes an overflow drain 31 which is also connected to the T fitting 29 via pipe 32 with a valve 33 connected to pipe 32 between the drain 31 and the T fitting 29.

Figure 2:
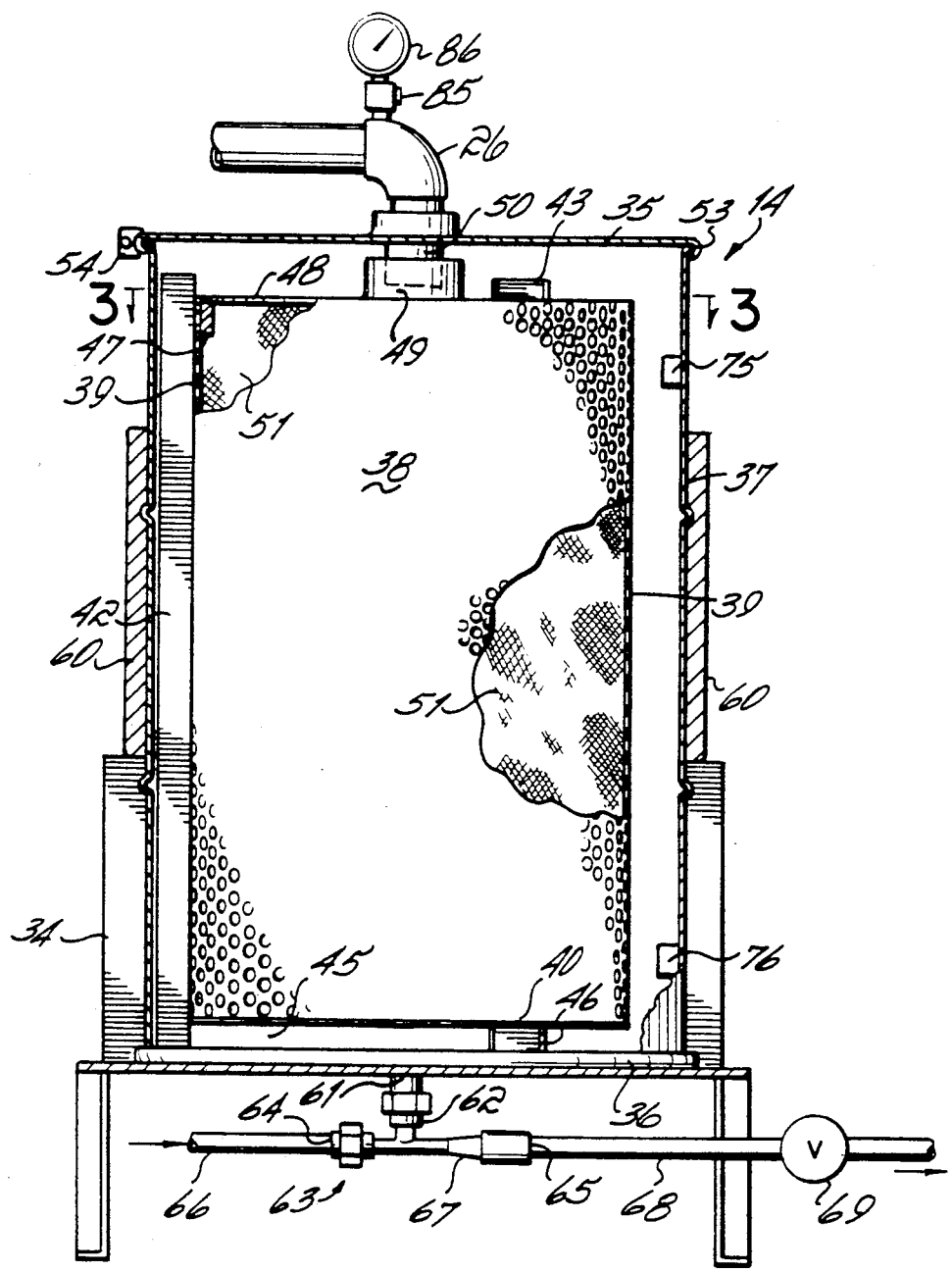
FIG. 2 is a cross-sectional view of the drum bagger of the present invention.
Figure 3:
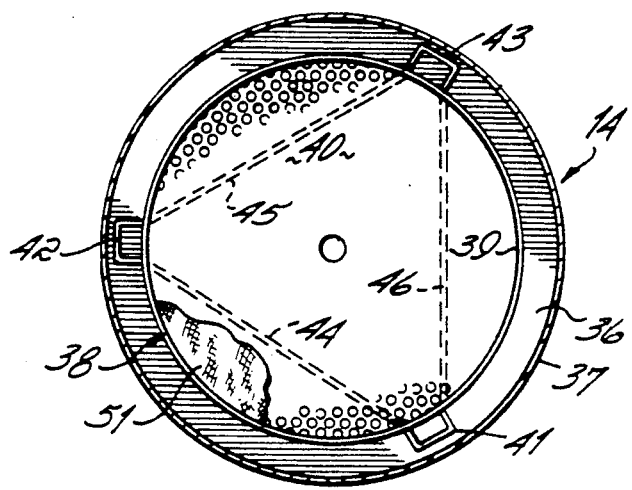
FIG. 3 is an overhead cross sectional view of a drum bagger of the present invention.

As shown, more particularly in FIGS. 2 and 3, the drum bagger 14 is also supported by a frame 34 and includes a top or lid 35, a bottom wall 36 and a cylindrical side wall 37. The water inlet 26 passes through the center of lid 35 and directly into a basket 38.

The basket 38 includes a cylindrical side wall 39 and a round bottom wall 40. The side wall 39 and bottom wall 40 are formed from perforated stainless steel, generally a quarter inch perforated stainless steel. Three 1×3 inch channel irons 41, 42 and 43 are welded to the side wall 39 of the metal basket 38 supporting the metal basket from about one inch from the bottom 36 of the drum bagger 14. One inch bars 44, 45 and 46 connect the channel irons beneath the bottom wall of the basket 38 and also support the basket above the bottom wall 36.

The basket 38 and channel irons 41-45 are of a size such that the channel iron fit within the drum bagger with a very small ($\frac{1}{8}$-$\frac{1}{4}$") spacing between the wall 37 of the drum bagger 14 and the channel irons 41, 42 and 43. This provides about a one inch gap between a side wall 39 and bottom wall 40 of the basket 38 and the side wall 37 and bottom wall 36 of the drum bagger 14.

Along the inside wall 30 of the basket 38 is welded an annular metal bar or rim. A disc shaped lid 48 rests on the rim 47. A pipe 49 extends through center of the lid 48 to provide an opening through the lid. Pipe 49 is centered with the opening of inlet 26 through lid 35 of the drum bagger 14. The inlet opening 26 also includes a pipe 50 which extends into pipe 49 and thereby directs all liquid coming through inlet 26 directly into the basket 38. There is a slight clearance between pipe 49 and pipe 50.

A filtration medium is supported inside the basket. The filtration medium is basically a bag 51 which includes a drawstring 52 (FIG. 1) fixed to the top of the bag. The drawstring hooks over the top of the three channel irons 41-43 holding it open during use (not shown). One suitable filtration material is Unipro 400 coolant medium sold by Midwest Filtration Company of Hamilton, Ohio.

The lid 35 of the drum bagger 14 is clamped on to the top rim 53 of the side wall 37 holding it in position. The clamp 54 is a typical clamp used for 55 gallon drums and forms an air-tight seal.

The bottom wall 36 of the drum bagger 11 includes a water outlet 61. Water outlet 61 is an internally threaded fitting. A liquid eductor 63 is attached to the outlet 61 with its suction inlet screwed into outlet 61. The liquid eductor 63 also includes a liquid inlet 64 and a liquid outlet 65. The liquid inlet 64 is connected to the pump 19 at the via pipe 66. The outlet 65 is then directed preferably to the settling tank 13 via pipe 68.

The liquid eductor 63 is a jet pump which through the use of a venturi 67 creates a suction through suction connection inlet 62. These can be purchased, for example, from Penbarthy of Prophetstown, Ill.

The drum bagger for certain applications may require heat to either improve the flow characteristics of the liquid or to further evaporate the liquid to provide a dry cake of material which may be required for disposal purposes. Therefore, a drum heater 60 encases the outer wall 37 of the drum bagger.

The present system is designed to operate continuously. In other words, the pump 19 attached to the filtration system should be able to constantly pull liquid through the filters 18. In effect, with the settling tank 13 filled, the pump will be constantly pulling filtered liquid from the filtration unit. Liquid can be added as needed through pipe 82 to the top of the settling tank 13.

Pump 19 has an outlet orifice of about two to four inches and passes to a T-fitting having a first outlet orifice 91 which is approximately two inches in diameter and a second outlet orifice 91a leading to pipe 66 which is about one-half inch in diameter. This provides a constant flow through pipe 66 of about three to five gallons per minute. This in turn passes through valve 17 to liquid eductor 63 providing constant flow of water through the eductor as pump 19 operates.

The eductor sucks in liquid or gas from the bottom of the drum bagger 14. Valves 28 and 33 remain closed during operation. Thus, there is a partial vacuum in the top of the drum bagger as well as the pipes 27 and 32. When it is desired to add liquid to the drum bagger, valve 28 or 33 are open and liquid is drawn by this partial vacuum into the drum bagger. The valves are then closed and the operation continues. The check valve 69 effectively prevents drawing in liquid through pipe 68 and eductor 63.

The filtration operation of the drum bagger is unique. Closing valves 28 and 33 provides a means to maintain a partial vacuum at the inner portion of the drum. Since there is clearance between pipe 50 and pipe 49 the pressure on the outside of the filtration medium bag 51 is the same as on the inside, i.e., there is little or no pressure differential in the drum bagger. Thus, the flow through the filtration bag itself is gravity fed. The reduced pressure within the drum bagger effectively improves the evaporation of liquid. Heater 60 further improves evaporation of liquid.

The operation of the apparatus of the present invention can be controlled manually or by a programmable controller. A suitable controller which can effectively operate the valves in the present system is the Allen Bradley SLC 150 programmable controller. This is a timed control system which can be varied depending upon the particular application. Sensors 75 and 76 can also be used to detect water level or alternately a scale can be used to determine when the drum bagger is full.

The system can be shut down to empty the drum bagger. To do this, valve 17 would be switched off. A valve 85 is opened to release the vacuum in the drum bagger. A vacuum gauge 86 can be used on inlet 26 to provide an indication of the pressure within the drum bagger.

Clamp 54 would be released and the lid 35 removed. Lid 48 would also be removed and the filter bag 51 removed and replaced.

Figure 4:
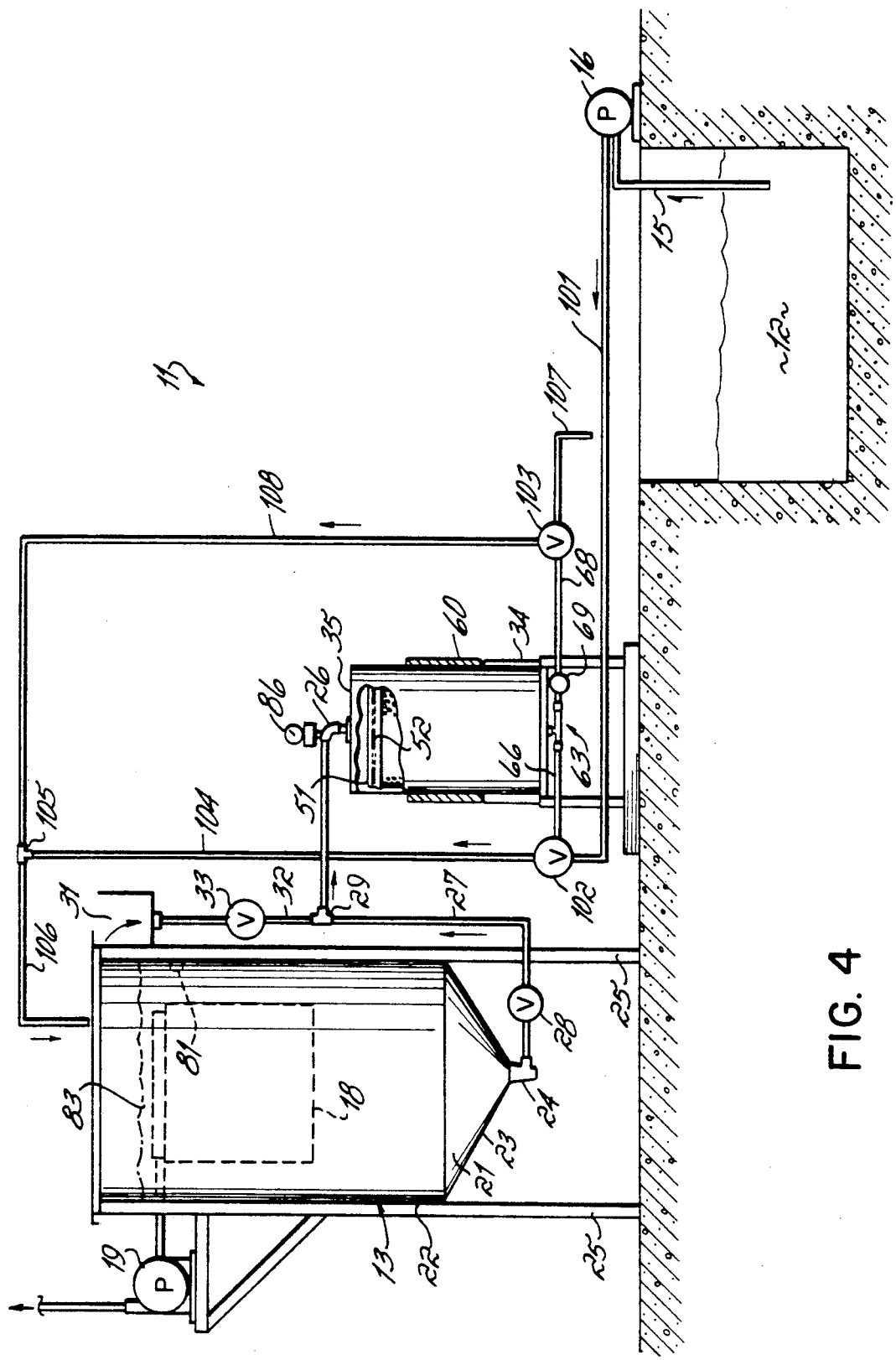
FIG. 4 is a diagrammatic view of an alternate embodiment of the present invention.

An alternate embodiment is shown in FIG. 4. The embodiment shown in FIG. 1 uses clean water pumped by pump 19 to power eductor 63. Alternately, the unpurified liquid from containment area 12 can be used to power the eductor. In this embodiment, the pump 16 would pump the liquid via line 101 to a valve 102. Valve 102 could direct the liquid from pump 16 either through eductor 63 through line 68 to valve 103, or through line 104 to T-fitting 105 into the top 83 of the settling tank via line 106. In the event the liquid would pass through valve 102, through the eductor, it could either be directed back into the settling tank through valve 103 via line 107 or up to the top 83 of the settling tank through lines 108 to the T-fitting 105 and through line 106. In this alternate embodiment, pump 16 would be operating continuously, and would enable the present invention to function without a separate pump for the liquid eductor. The drum bagger and settling tank would function as per the embodiment shown in FIG. 1.

With respect to this invention, various different filtration apparatus can be used in the settling tank or the settling tank can be used without a filtration unit. In certain embodiments, one may not use a settling tank but use other apparatus in combination with the drum bagger. There are obviously many variants of the present invention which can be adopted without departing from the present invention. The preceding has been a description of the present invention along with the best mode currently known of practicing this invention.

However, the invention should be defined only by the appended claims wherein I claim:

1. A drum bagger including a vacuum vessel having a top, a bottom and a side wall;
   a liquid inlet through the top of said tank;
   valve means adapted to close said liquid inlet;
   a filter basket adapted to support a filter medium said bracket open to said inlet and separated from said bottom and side walls of said vacuum vessel;
   a venturi eductor outside and below said bottom wall communicating with an interior of said vacuum vessel through said bottom wall;
   a pump adapted to force liquid through said eductor to create a suction through said venturi eductor at the bottom of said vacuum vessel to thereby draw liquid from the interior of said drum bagger such that when said valve means is closed said venturi acts to draw a vacuum in the interior of said tank to remove liquid and to dry material collected in said filter basket.

2. The drum bagger claimed in claim 1 further including a filter medium attached to said filter basket.

3. The drum bagger claimed in claim 2 wherein filter basket comprises a cylindrical filter basket.

4. A water purification system including a settling tank having a particulate collection point at the bottom of said settling tank;
   an outlet from said bottom of said settling tank leading to an inlet of a drum bagger said drum bagger including a vacuum vessel having a top, bottom and side wall, a water inlet passing through said top wall leading to the interior surface of a filtration medium support, said filtration medium support separated from the bottom and side walls of said vacuum vessel;
   a vacuum eductor outside and below said vacuum vessel adapted to suck water from said vacuum vessel through the bottom of said drum bagger;
   a pump adapted to pass purified liquid from said settling tank and pump a portion of said liquid through said vacuum eductor to thereby create a suction within said vacuum vessel and draw liquid from said drum bagger.

5. The water purification system claimed in claim 4 further comprising a valve between said outlet of said settling tank and the inlet to said drum bagger providing a partial vacuum within said vacuum vessel during the operation of said eductor such that said partial vacuum assists in drawing liquid into said drum before when said valve is open.

6. The water purification system claimed in claim 5 wherein said settling tank further includes an overflow drain adapted to direct overflow from said settling tank to the top of said drum bagger.

7. A method of purifying a particulate containing liquid comprising admitting said liquid to the top of a drum bagger into a filter medium separated from the side walls of said drum bagger, sealing said drum bagger, drawing a vacuum through the bottom of said bagger using an eductor by pumping liquid through said eductor thereby sucking liquid through said filtration medium and through said eductor.

8. The method claimed in claim 7 wherein said liquid is pulled by vacuum into said drum bagger from a settling tank.

9. A water purification system including a settling tank having a particulate collection point at the bottom of said settling tank;
   an outlet from said bottom of said settling tank leading to an inlet of a drum bagger said drum bagger comprising a vacuum vessel including a top, bottom and side wall, a water inlet passing through said top wall leading to the interior surface of a filtration medium support, said filtration medium support separated from the bottom and side walls of said vacuum vessel;
   a vacuum eductor through the bottom of said vacuum vessel adapted to suck water from said vacuum vessel;
   a pump adapted to pass unpurified liquid through said vacuum eductor providing a suction within said vacuum vessel and draw liquid from said drum bagger;
   means to direct unpurified liquid from said pump to one of said eductor and said settling tank.

10. The water purification system claimed in claim 9 further wherein said settling tank further includes a suction filtration apparatus.

11. The water purification system claimed in claim 9 further including means to selectively direct unpurified liquid passed through said eductor to selectively one of said settling tank and said unpurified liquid containment area.

* * * * *